United States Patent [19]

Dibiasi

[11] Patent Number: 4,489,020

[45] Date of Patent: Dec. 18, 1984

[54] METHOD OF FORMING CROSSLINKED STYRENIC POLYMER ARTICLES AND THE ARTICLES

[75] Inventor: Daniel J. Dibiasi, Pittsford, N.Y.

[73] Assignee: Mobil Oil Corporation, New York, N.Y.

[21] Appl. No.: 450,851

[22] Filed: Dec. 20, 1982

[51] Int. Cl.³ ............................................. B29D 27/00
[52] U.S. Cl. .................................. 264/26; 156/244.11;
    264/37; 264/53; 264/321; 264/DIG. 18
[58] Field of Search ................. 264/26, DIG. 18, 321,
    264/37, 53; 156/244.11

[56] References Cited

U.S. PATENT DOCUMENTS

| | | | |
|---|---|---|---|
| 3,737,488 | 6/1973 | Porter et al. | 264/26 |
| 3,803,274 | 4/1974 | Nakashima et al. | 264/26 |
| 3,812,225 | 5/1974 | Hosoda et al. | 264/DIG. 18 |
| 4,205,114 | 5/1980 | Canterino et al. | 428/315 |
| 4,372,898 | 2/1983 | Menges et al. | 264/26 X |

Primary Examiner—Philip Anderson
Attorney, Agent, or Firm—Michael G. Gilman; James P. O'Sullivan; Alexander J. McKillop

[57] ABSTRACT

A microwave energy treated cross-linked styrenic polymer shaped article and method of forming the same.

8 Claims, 1 Drawing Figure

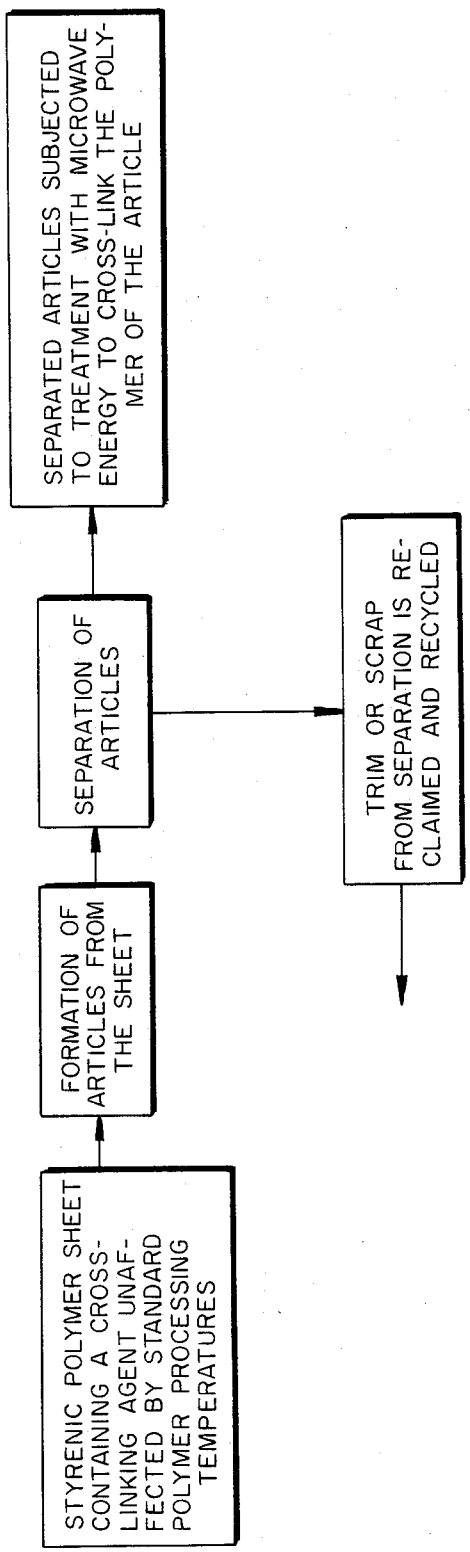

METHOD OF FORMING CROSSLINKED STYRENIC POLYMER ARTICLES AND THE ARTICLES

BACKGROUND OF THE INVENTION

This invention is concerned with a method for preparing cross-linked styrenic polymer articles, for example, trays, containers, flat tableware, egg cartons, etc. and the so-crosslinked polymer articles.

It is well known in the art to produce various shaped articles from foamed and unfoamed polystyrene sheets by thermoforming methods. As indicated above, many such articles are containers used for packaging foods or for the serving of foods. Polystyrene containers, however, are melted by hot fats and cannot be used to package fat-containing foods that are to be heated. Even when treated by radiation, the polystyrene containers still are not resistant to hot fats. This problem has been addressed in U.S. Pat. No. 4,205,114, which solves the problem by utilizing poly(p-methylstyrene) since it can be cross-linked by ionizing radiation to yield a cross-linked polymer which is resistant to the solvent action of fats.

The present invention has for its object a technique for the cross-linking of styrenic polymers in otherwise completed article form.

SUMMARY OF THE INVENTION

The present invention provides a method of forming cross-linked styrenic articles comprising:
(a) providing a styrenic polymer sheet containing a cross-linking agent therefore which is capable of producing a crosslinked structure within said sheet when activated by microwave energy but which is unaffected by standard polymer sheet processing temperatures;
(b) thermoforming articles within said sheet;
(c) separating and recycling reclaimable trim or scrap from said articles; and
(d) subjecting said articles to sufficient microwave energy for a sufficient period of time to effectively crosslink the polymer of said articles.

In a preferred embodiment of the present invention the styrenic polymer sheet employed is polystyrene or poly(p-methylstyrene).

BRIEF DESCRIPTION OF THE DRAWING

The sole FIGURE of drawing is a schematic flow diagram depicting the sequential steps of the method of the present invention.

DETAILED DESCRIPTION OF THE INVENTION

The present invention takes advantage of the fact that certain cross-linking agents, in the presence of a styrenic polymer, are activatable by microwave energy and are not activated by the heat generated in conventional processing equipment, for example, equipment having heat sources such as calrods, hot liquid or gas, etc. It is desirable to crosslink the styrenic polymers employed in the formation of the subject structures, e.g., tableware, because this imparts strength and solvent resistance to the polymer. Usually such articles are formed by a thermoforming process whereby a plurality of female dies are employed with vacuum forming means to form a plurality of article impressions in a polymer sheet. Alternatively a plurality of female and male dies can be employed in combination to form a plurality of thermoformed article impressions in a polymer sheet. Such a technique produces a significant quantity of waste or trim after the plurality of articles are separated from the sheet. Obviously, it is desirable where possible, to recycle this scrap polymer so that, in effect, there is zero loss of resin input. The present process permits articles to be thermoformed and separated from the common sheet of origin and, though crosslinking agent is present, no crosslinking has occurred, so reclaim without contamination can be obtained. The separated articles can than be subjected to microwave energy for the crosslinking of the polymer thereof and the non-crosslinked scrap material can be recycled to become part of additional stock sheet in the non-crosslinked condition, as schematically illustrated in the drawing.

Any styrenic polymer which may be crosslinked by an agent which is activated by microwave energy is contemplated herein. Polystyrene will be employed to exemplify the process. Polystyrene foam sheet can be prepared by any technique known to the art. U.S. Pat. No. 3,444,283, which is incorporated herein by reference, describes a technique which is suitable for use herein. The present invention contemplates including an appropriate crosslinking agent either in the polymer in its foamed foam or in its unformed form. The structures contemplated herein likewise can either be in the foamed form or in the non-foamed form or in a laminate comprising an unfoamed and a foamed polymer. In these instances, the unfoamed or the foamed polymer or both can contain the crosslinking agent which is activatable by microwave energy.

Examples of crosslinking agents which can be added to the polystyrene are broadly polar peroxides, for example, t-butylperbenzoate, t-butylhydroperoxide, cumylhydroperoxide, 1,3-bis(t-butylperoxyisopropyl) benzoate etc. Non-polar peroxides can be employed in conjunction with a auxiliary agent. Examples of nonpolar peroxides are dicumylperoxide and di-ti-butylperoxide. An example of the polar auxiliary agent is triallyloxy-s-triazine.

The amount of crosslinking agent can vary but should be sufficient to cause enough crosslinking so as to enhance the physical properties of the polymer. When employing a polar peroxide the percentage can broadly range from about 0.5–5% by weight of the overall composition. When a nonpolar peroxide is used in combination with an auxiliary agent, equal parts of the two can be employed, so that each is present in from 0.5 to about 5% by weight of the composition.

It has been determined that the power requirements for treating the articles of the present invention are well within the range of commercial microwave ovens. Units ranging up to 6.5 Kw of power are contemplated. For greater power requirements, power units can be increased in 2.5 Kw increments for productivity efficiency. The manufactured articles containing the crosslinking agent dispersed therein can be passed through a microwave oven at a rate adapted to permit optimum cross-linking under the influence of appropriate microwave energy. The articles also can be passed through a wave-guide device having multiple microwave zones in association therewith. The articles can traverse the wave guide device and be subjected to the microwave energy.

The following examples are illustrative of the present invention.

EXAMPLE I

Using conventional film extrusion apparatus, a 1 mil nonfoamed film of polystyrene containing approximately 5% by weight t-butylperbenzoate is extruded and wound onto a mandrel. Foam sheet is prepared by the technique of U.S. Pat. No. 3,444,283 which is incorporated herein by reference in its entirety. Approximately 5% by weight of the t-butylperbenzoate is combined with polystyrene, and employing isopentane foaming agent and a nucleating agent consisting of a combination of equal parts of sodium bicarbonate and citric acid (0.3 parts by weight per 100 parts of polystyrene resin feed) the foamed sheet is extruded. The film and the foam sheets containing the polar compound are laminated together and aged in the usual manner to permit air exchange of the blowing agent. Thereafter, the laminate of film and foam is subjected to a thermoforming operation wherein a plurality of table plates are formed into the composite sheet. The table plates are individually separated from the multi-impression unit and the scrap polymer is recycled back into a holding hopper for use in forming additional film or foam sheet. Simultaneously, the stacked table plates are transported through a microwave station so that each plate is subjected to microwave energy of 6.5 Kw for a period of 60 seconds. These plates will be resistant to the solubilizing effect of animal fats to a significantly greater extent than identical polystyrene plates not crosslinked by the technique described above.

EXAMPLE II

Table plates are made as in Example I, except as the crosslinking agent, 5% by weight of equal parts of dicumylperoxide and triallyloxy-s-triazine is employed. Effective crosslinking will be evidenced by the significant resistance to dissolution in the presence of animal fat as compared with non-crosslinked polystyrene table plates.

EXAMPLE III

Table plates are prepared as in Example I except poly(p-methylstyrene) is employed as the polymer instead of polystyrene. Effectively crosslinked table plates will result. While poly(p-methylstyrene) can be crosslinked by, for example, electron beam radiation, the present technique is significantly less expensive.

It is to be understood that in the case of employing a laminate of film and foam polymer, the crosslinking agent can be in either the film or the foam or in both.

It is also to be understood that the phrase "standard polymer sheet processing temperatures" is intended to refer to temperature ranges encountered in the normal processing of polymer sheet or foam. Generally, these temperatures will range up to about 450° F.

What is claimed is:

1. The method of forming crosslinked styrenic polymer articles comprising:
    (a) providing a styrenic polymer sheet containing a crosslinking agent therefor which is capable of producing a crosslinked structure when activated by microwave energy but which is unaffected by standard polymer sheet processing temperatures;
    (b) forming articles from said sheet;
    (c) separating and recycling reclaimable trim or scrap from said articles; and
    (d) subjecting said articles to sufficient microwave energy for a sufficient period of time to effectively crosslink the styrenic polymer of said articles.

2. The method of claim 1 wherein the styrenic polymer is polystyrene or poly(p-methylstyrene).

3. The method of claim 2 wherein said styrenic polymer is in foam form or a laminate of foam form and film form.

4. The method of claim 3 wherein at least one form of the polymer contains said crosslinking agent.

5. The method of claim 1 wherein the crosslinking agent is a organic polar peroxide.

6. The method of claim 5 wherein the peroxide is a member selected from the group consisting of t-butylperbenzoate, t-butylhydroperoxide, cumylhydroperoxide and di-t-butylperoxide.

7. The method of claim 1 wherein the crosslinking agent is a combination of an organic nonpolar peroxide and triallyloxy-3-triazine.

8. The method of claim 7 wherein the nonpolar peroxide is either dicumylperoxide or 1,3-bis(t-butylperoxyisopropyl) benzoate.

* * * * *